United States Patent [19]

Tuttle

[11] Patent Number: 5,676,709

[45] Date of Patent: *Oct. 14, 1997

[54] METHOD OF FORMING BATTERY TERMINAL HOUSING MEMBERS AND BATTERY TERMINAL HOUSING MEMBER SHEETS

[75] Inventor: Mark E. Tuttle, Boise, Id.

[73] Assignee: Micron Communications, Inc., Boise, Id.

[ * ] Notice: The term of this patent shall not extend beyond the expiration date of Pat. No. 5,584,891.

[21] Appl. No.: 739,169

[22] Filed: Oct. 30, 1996

Related U.S. Application Data

[63] Continuation of Ser. No. 591,235, Jan. 18, 1996, Pat. No. 5,584,891.

[51] Int. Cl.[6] .................................................. H01M 6/00
[52] U.S. Cl. ................................. 29/623.1; 29/623.5
[58] Field of Search ............................. 29/623.1, 623.2, 29/623.5; 427/259, 270, 272, 282, 307; 429/162, 163

[56] References Cited

U.S. PATENT DOCUMENTS

| | | | |
|---|---|---|---|
| 4,418,239 | 11/1983 | Larson et al. | 174/34 |
| 4,693,530 | 9/1987 | Stillie et al. | 439/67 |
| 4,781,620 | 11/1988 | Tengler et al. | 439/497 |
| 4,933,743 | 6/1990 | Thomas et al. | 357/71 |
| 5,000,818 | 3/1991 | Thomas et al. | 156/643 |
| 5,117,276 | 5/1992 | Thomas et al. | 357/71 |
| 5,123,325 | 6/1992 | Turner | 84/731 |
| 5,176,538 | 1/1993 | Hansel, III et al. | 439/607 |

Primary Examiner—Anthony Skapars
Attorney, Agent, or Firm—Wells, St. John, Roberts, Gregory & Matkin P.S.

[57] ABSTRACT

A method of forming a button-type battery terminal housing member sheet includes, a) providing an electrically conductive sheet having an exposed surface, the conductive sheet being divisible into a plurality of individual button-type battery terminal housing member regions; b) masking portions of the respective regions of the exposed sheet surface with a masking material; c) applying an uncured and flowable gasket material onto unmasked portions of the respective regions of the exposed sheet surface; d) allowing the applied uncured gasket material to at least partially cure; and e) after at least partially curing the gasket material, removing the masking material from the masked portions of the respective regions of the exposed sheet surface. The sheet is preferably utilized in formation of a plurality of button-type batteries. A plurality of discrete first terminal housing members are cut and formed from the electrically conductive sheet regions. A discrete electrically conductive second terminal housing member is provided in facing juxtaposition to one of the first terminal housing members, with an anode, cathode, separator and electrolyte positioned therebetween. The first and second terminal housing members are then crimped together into an enclosed battery housing with the gasket material being interposed between the first and second terminal housing members to provide a fluid-tight seal and to provide electrical insulation therebetween.

18 Claims, 5 Drawing Sheets

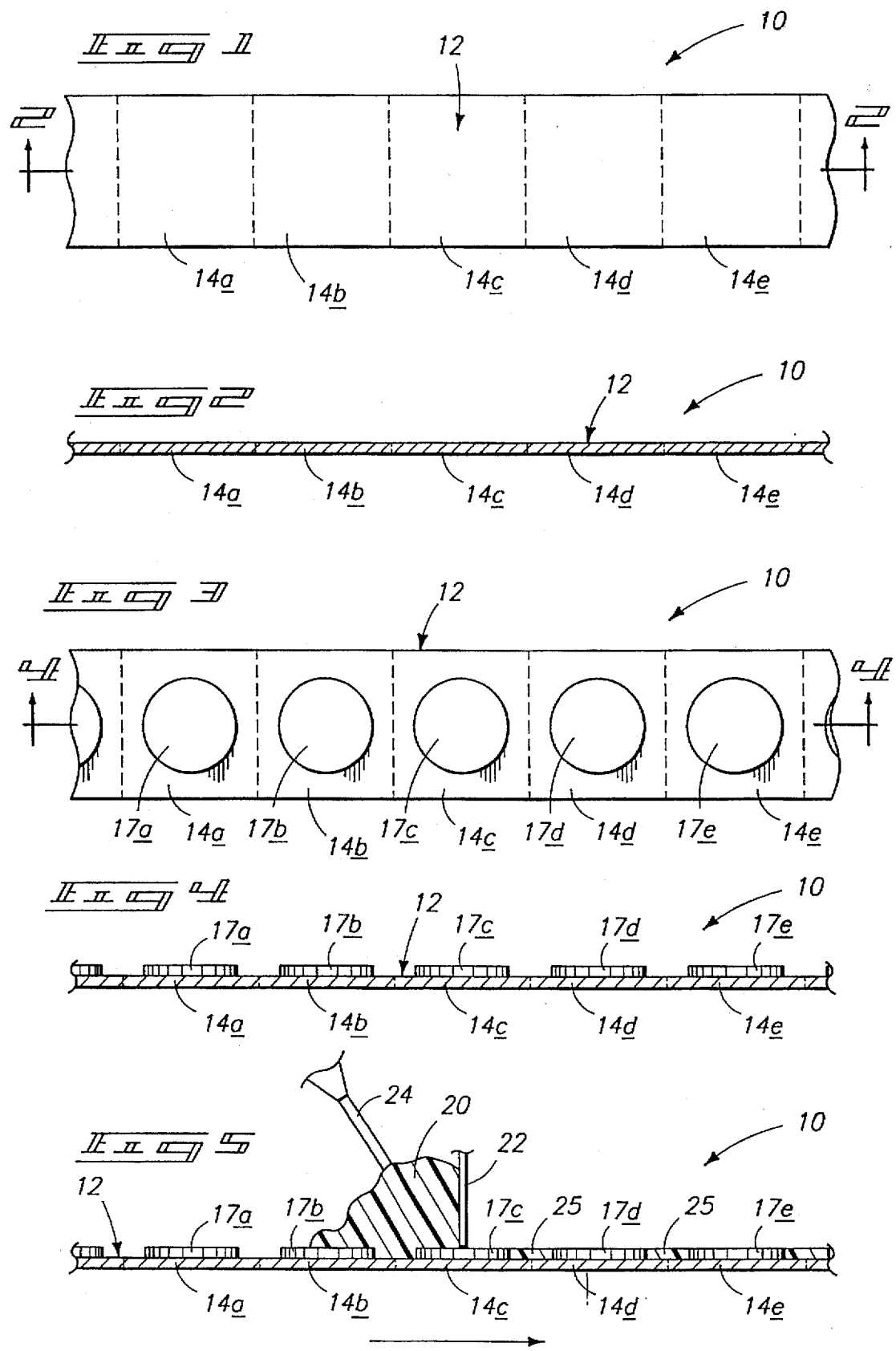

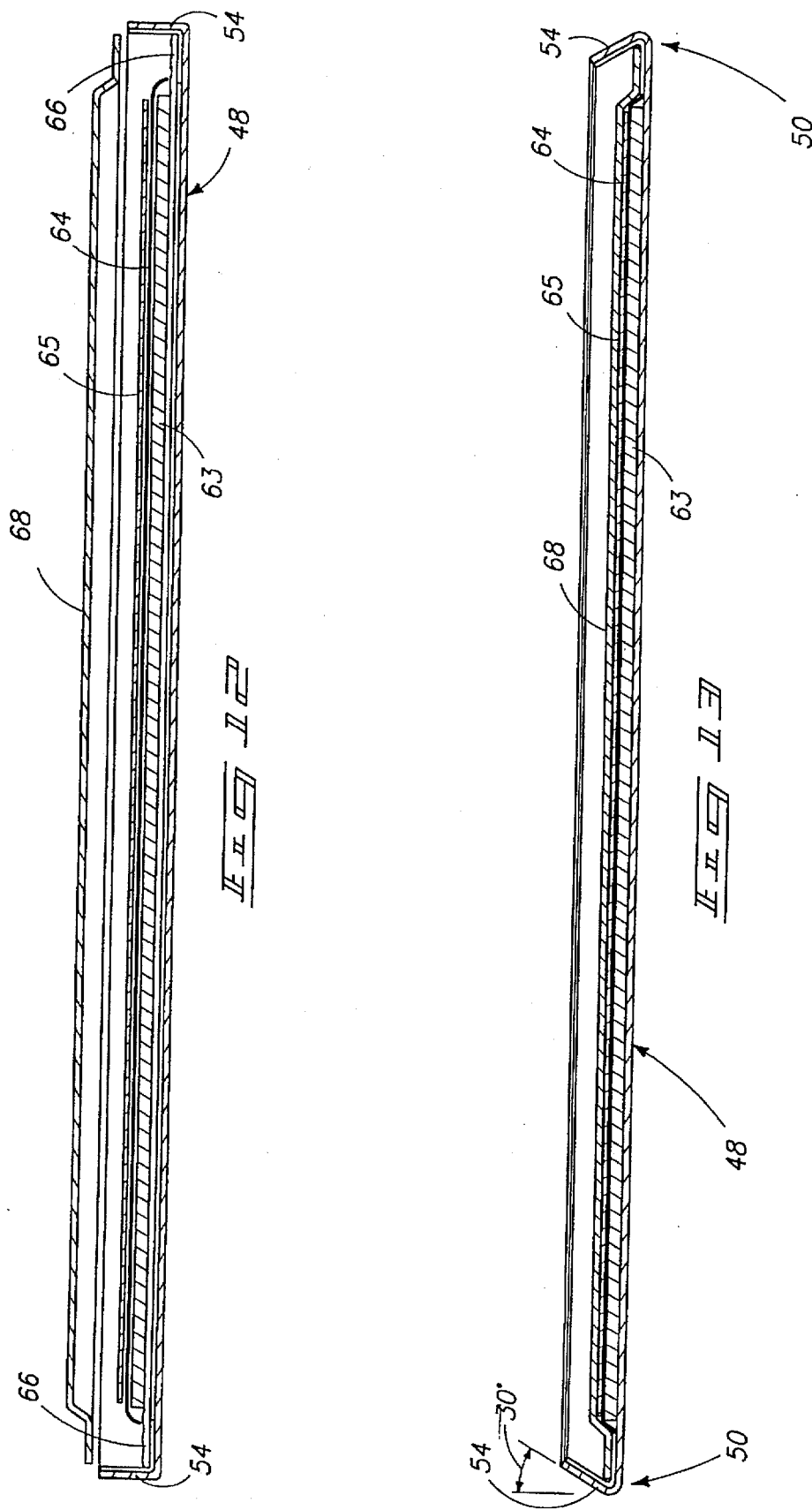

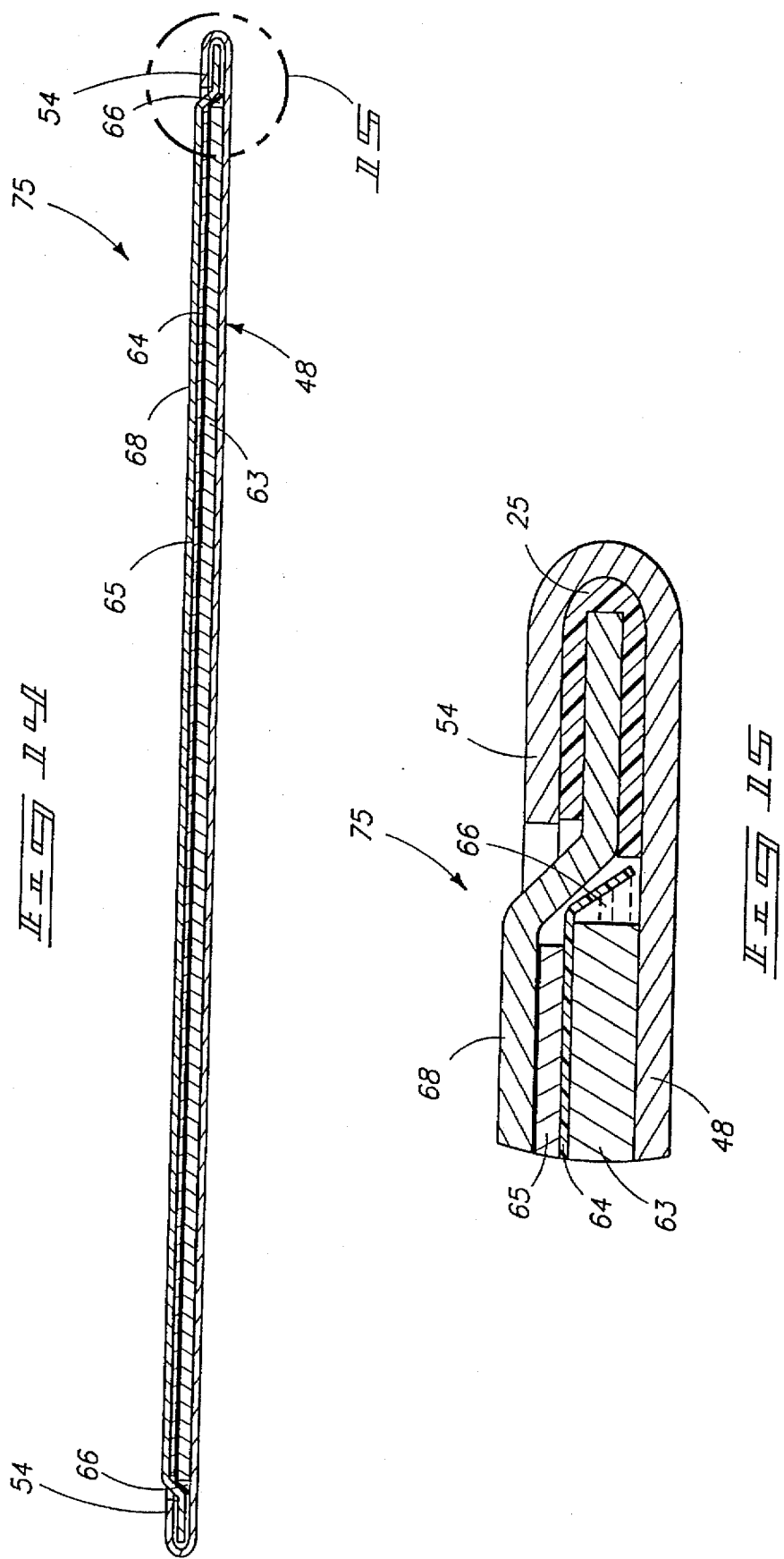

METHOD OF FORMING BATTERY TERMINAL HOUSING MEMBERS AND BATTERY TERMINAL HOUSING MEMBER SHEETS

RELATED PATENT DATA

This patent resulted from a continuation application of U.S. patent application Ser. No. 08/591,235, filed on Jan. 18, 1996, entitled "Methods of Forming a Button-Type Battery Terminal Housing Member Sheet and of Forming Button-Type Batteries" listing the inventor as Mark E. Tuttle, and which is now U.S. Pat. No. 5,584,891.

TECHNICAL FIELD

This invention relates to methods of forming a button-type battery terminal housing member sheet, of forming a plurality of button-type battery terminal housing members, and of forming button-type batteries.

BACKGROUND OF THE INVENTION

Button-type batteries are small, thin energy cells that are commonly used in watches and other electronic devices requiring a thin profile. A conventional button-type battery includes two electrodes in the form of an anode and a cathode. These are separated by a porous separator. An electrolyte is present within pores of the separator.

These internal battery components are housed within a metal casing or housing formed by a lower conductive can and an upper conductive lid. A common prior art material for the can and lid is stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically isolate the two housing members.

This invention concerns the provision of the sealing gasket material relative to button-type battery terminal housing members.

BRIEF DESCRIPTION OF THE DRAWINGS

Preferred embodiments of the invention are described below with reference to the following accompanying drawings.

FIG. 1 is a top view of an electrically conductive sheet at one processing step in accordance with the invention.

FIG. 2 is a cross-sectional view taken through line 2—2 in FIG. 1.

FIG. 3 is a top view of the FIG. 1 sheet at a processing step subsequent to that shown by FIG. 1.

FIG. 4 is a sectional view taken through line 4—4 in FIG. 3.

FIG. 5 is a sectional view the FIG. 1 sheet at a processing step subsequent to that shown by FIG. 4.

FIG. 12 is an enlarged, more-to-scale, cross-sectional, exploded view of a 20 mm diameter battery preassembly utilizing the FIGS. 10 and 11 housing member, and other components.

FIG. 13 is a cross-sectional view of the FIG. 12 assembly at a processing step subsequent to that shown by FIG. 12.

FIG. 14 is a cross-sectional view of an assembled button-type battery construction.

FIG. 15 is an enlarged cross-sectional view of a peripheral sealing portion of the FIG. 14 assembly.

DETAILED DESCRIPTION OF THE PREFERRED EMBODIMENTS

Figure 6:
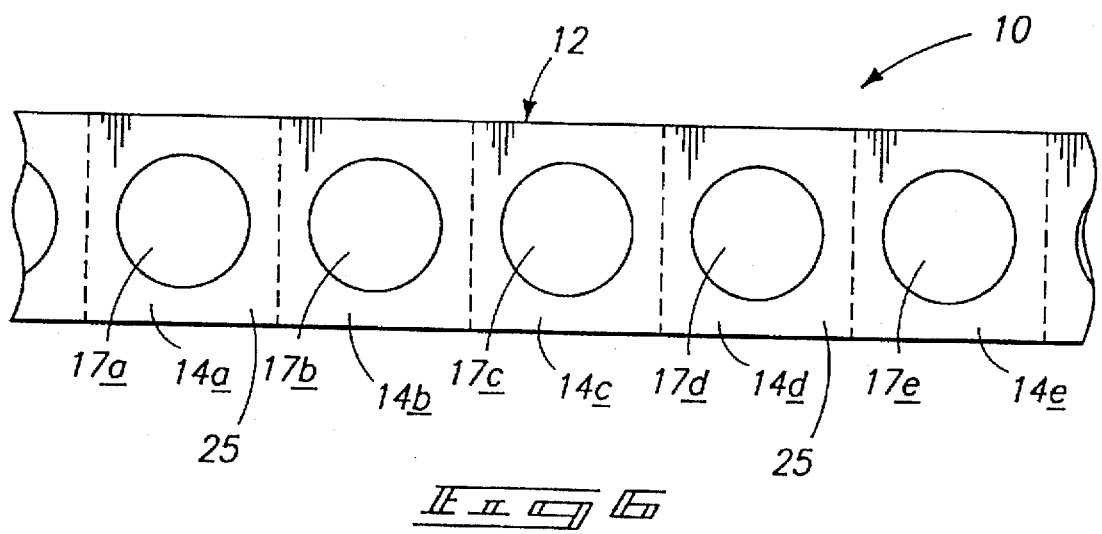
FIG. 6 is a top view of the FIG. 1 sheet at a processing step subsequent to that shown by FIG. 5.

This disclosure of the invention is submitted in furtherance of the constitutional purposes of the U.S. Patent Laws "to promote the progress of science and useful arts" (Article 1, Section 8).

In accordance with one aspect of the invention, a method of forming a button-type battery terminal housing member sheet comprises the following steps:

providing an electrically conductive sheet having an exposed surface, the conductive sheet being divisible into a plurality of individual button-type battery terminal housing member regions;

masking portions of the respective regions of the exposed sheet surface with a masking material;

applying an uncured and flowable gasket material onto unmasked portions of the respective regions of the exposed sheet surface;

allowing the applied uncured gasket material to at least partially cure; and after at least partially curing the gasket material, removing the masking material from the masked portions of the respective regions of the exposed sheet surface.

In accordance with another aspect of the invention, a method of forming a button-type battery comprises the following steps:

providing a terminal housing member electrically conductive sheet having cured electrically insulative gasket material adhered thereto in patterns, the terminal housing member conductive sheet having been provided by:

providing an electrically conductive sheet having an exposed surface, the conductive sheet being divisible into a plurality of individual button-type battery terminal housing member regions;

masking portions of the respective regions of the exposed sheet surface with a masking material;

applying an uncured and flowable gasket material onto unmasked portions of the respective regions of the exposed sheet surface;

allowing the applied uncured gasket material to at least partially cure; and after at least partially curing the gasket material, removing the masking material from the masked portions of the respective regions of the exposed sheet surface;

cutting and forming a plurality of discrete first terminal housing members from the electrically conductive sheet regions, the forming including bending the discrete first terminal housing members into desired battery terminal shapes;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed battery housing with the gasket material being interposed between the first and second terminal housing members to provide a fluid-tight seal and to provide electrical insulation therebetween.

Other aspects of the invention will be appreciated from the continuing discussion which proceeds with reference to the figures. Specifically, FIGS. 1 and 2 illustrate an electrically conductive sheet indicated generally with reference numeral 10. An example and preferred material for sheet 10 is stainless steel, or nickel coated stainless steel, having a nominal thickness of from 4 mils to 10 mils. Sheet 10 comprises an exposed surface 12, and can be considered as divided or divisible into a plurality of individual button-type battery terminal housing member regions 14a, 14b, 14c, 14d, and 14e.

Referring to FIGS. 3 and 4, portions of the respective regions 14 of the exposed sheet surface 12 are masked with a masking material, providing the illustrated masking disks 17a, 17b, 17c, 17d, and 17e. Masking disks 17 effectively form respective negative masking blocks as will be apparent from the continuing discussion. Such effectively mask portions of exposed surface 12 where resultant gasket material is not desired. Such material is preferably adhered to exposed sheet surface 12, with the masking material being chosen to be selectively etchable from conductive sheet 10 and from gasket material to be provided subsequently. Example and preferred masking materials include photoimageable solder masks, such as PROBYMER 52 available from Ciba-Geigy of Hawthorne, N.Y.

The masking material can be provided in a number of manners. One preferred technique is by stamp or pad printing of the masking material with an appropriate pad or stamp to exposed sheet surface 12. Alternately, the masking material might be provided by screen printing, spray painting, or some other technique whereby the illustrated patterns 17 are produced.

Referring to FIG. 5, an uncured and flowable gasket material 20 is applied onto unmasked portions of the respective regions 17 of exposed sheet surface 12. As shown, a gasket material spreader bar 22 is positioned in close proximity to conductive sheet 10 having masking material 17 thereon. Spreader bar 22 is preferably flexible, with a preferred distance from the outer surfaces of masking disks 17 being from 0 to 1 mil. Flowable gasket material 20 is provided onto conductive sheet 12 and over masking material 17 adjacent spreader bar 22 from a dispensing tube 24. Relative movement is then imparted between spreader bar 22 and conductive sheet 12 to cause spreader bar 22 to apply a substantially even film 25 of gasket material 20 to the unmasked portions of respective sheet regions 14. The result in shown in FIG. 6.

In the preferred embodiment, conductive sheet 12 is caused to move relative to spreader bar 22 and gasket material dispensing tube 24 which remain stationary. Alternately but less preferred, conductive sheet 12 could remain stationary, and spreader bar 22 and gasket material dispensing 24 caused to move. Also as shown in accordance with the preferred method, gasket material 20 of film 25 is provided to the same substantial selected thickness as that of masking blocks 17, with an example thickness being 4 mils.

Applied uncured gasket material in the form of film 25 is then allowed to at least partially cure such that it has substantially lost its original flowable characteristics. Example and preferred flowable and subsequently curable gasket materials include epoxy resins, such as FUSOR 305 from Lord Corporation of Erie, Pa. Such material will ultimately be utilized in providing a fluid tight seal between battery terminal housing member components and yet still provide electrical separation thereof.

Figure 7:
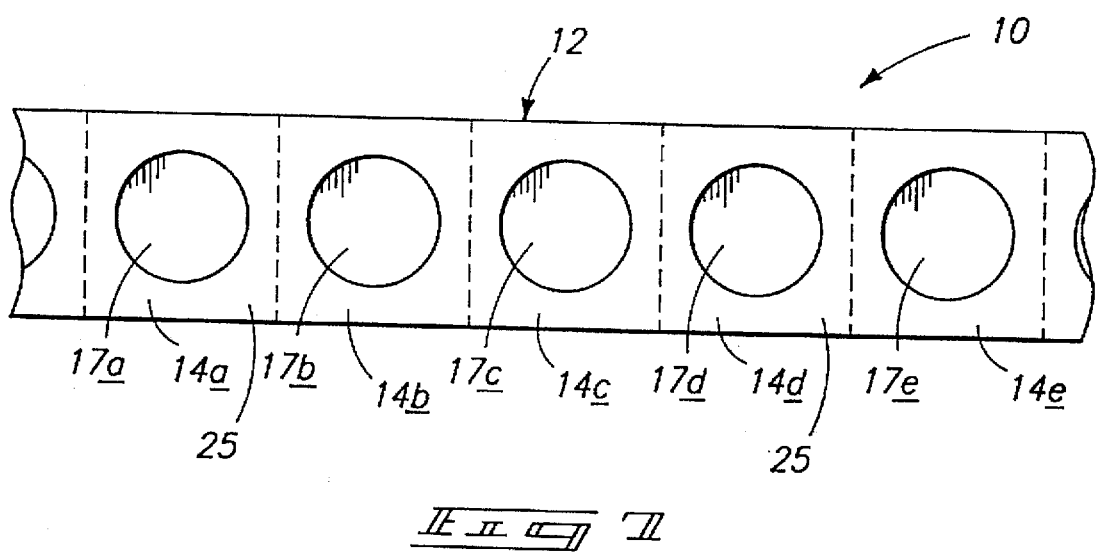
FIG. 7 is a top view of the FIG. 1 sheet at a processing step subsequent to that shown by FIG. 6.

Referring to FIG. 7, and after at least partially curing gasket material 20/25, masking material disks 17a, 17b, 17c, 17d and 17e are removed from the masked portion of regions 14a, 14b, 14c, 14d, and 14e, respectively, of exposed sheet surface 12. Preferably, gasket material 20/25 is allowed to substantially or completely cure prior to removing masking material 17.

Figure 8:
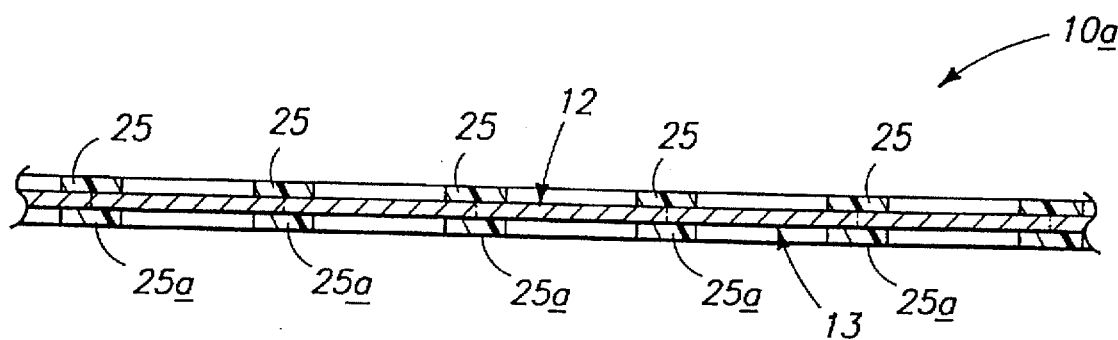
FIG. 8 is a sectional view of an alternate embodiment conductive sheet processed in accordance with the invention.

FIG. 8 illustrates an alternate embodiment whereby an opposing exposed surface 13 of an electrically conductive sheet 10a is also processed in the same above manner to provide gasket material 25 and 25a effectively on both sides of sheet 10. Such would most likely be provided in a sequence of subsequent steps to that utilized for provision of film 25 on exposed surface 12, although simultaneous provision of gasket material 25/25a is contemplated.

Figure 9:
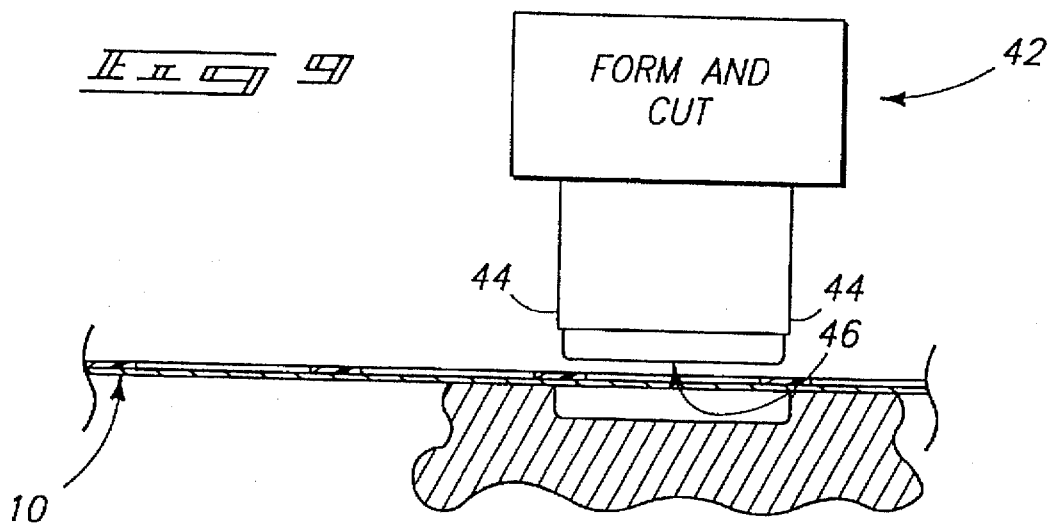
FIG. 9 is a diagrammatic side sectional plan view of a processing step in accordance with the invention.

Sheet 10 or 10a is utilized in the formation of a plurality of button-type battery terminal housing members. For example with reference to FIG. 9, sheet 10 is passed through a cutting and forming station 42. There, a plurality of discrete first terminal housing members are cut and formed from individual areas 14a, 14b etc. of conductive composite sheet 10 or 10f, with the respective first terminal housing members comprising a portion of the gasket material patterns. In the described embodiment, the patterned gasket material in a given area 14 comprises more gasket material than is present in the entirety of a finished discrete gasket of one terminal housing member of an assembled button-type battery. Specifically, station 42 comprises a cutting and forming tool including a ring die cutter 44 having an inner diameter which is greater than that of the holes left by removal of masking material 17 to define a finished gasket shape. Cutting edge 44 therefore cuts through gasket material of sheet 10 as it is cutting the metal material to ensure that the gasket material extends to the edges of the first terminal housing members being formed. A central forming press 46 is sized to engage diametrically outward of the holes left by removal of masking material 17, as shown.

Figure 11:
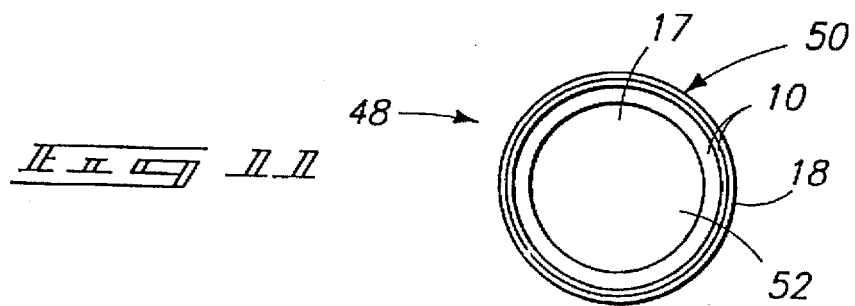
FIG. 11 is a top view of FIG. 10.

The cutting and forming tool of station 42 is operated to form and cut material from sheets 10 to produce a plurality of discrete first terminal housing members, such as the one terminal housing member 48 illustrated in FIGS. 11 and 12. In the illustrated preferred embodiment, the cutting and forming defines a container having a peripheral bend 50 extending continuously about a circular base 52 upwardly at approximately 90°, thus defining sealing peripheral portions 54. The illustrated forming action includes bending of the adhered gasket material.

Referring to FIG. 12, first terminal housing member 48 is provided with a cathode 63, porous separator 64, anode 65 and liquid electrolyte 66, which can be of conventional construction. For example, cathode 63 can be formed of a compressed tablet made from a combination of manganese (IV) oxide, carbon, and teflon powder. An example preferred thickness of cathode 63 is 8 mils (0.2032 mm). Separator 64 can be a woven or porous polymeric material, such as polyethylene or polypropylene. An example preferred thickness of separator 64 is 1 mil (0.0254 mm). Anode 65 is preferably formed of elemental lithium. An example thickness of anode 65 is 3 mils (0.0762 mm).

An example electrolyte 66 comprises a solution of propylene carbonate and ethylene glycol dimethylether, having dissolved lithium hexafluoroarsenate. Suitable electrolyte components are supplied by Aldrich Chemical Company of Milwaukee, Wis. The volume of electrolyte 66 provided within first terminal housing member 48 is preferably gauged to saturate the separator and cathode within housing member 48, yet not so great to leak out upon crimp sealing the battery assembly.

Referring further to FIG. 12, a separately formed discrete electrically conductive second terminal housing member 68 is provided in facing juxtaposition to first terminal housing member 48. An example material for second housing member 68 would be Type 304 stainless steel having a thickness of 4 mils (0.1016 mm). The illustrated anode, cathode and separator and electrolyte are positioned intermediate first housing member 48 and second housing member 68. Anode 65 is positioned to ultimately electrically contact or otherwise electrically connect with second housing member 68, while cathode 63 is positioned to electrically contact or otherwise electrically connect with first housing member 48.

Referring to FIG. 13, second housing member 68 is pressed downwardly somewhat while sealing peripheral portions 54 are further bent inwardly from 90° about peripheral bend 50. In the preferred and illustrated embodiment, the initial bend past 90° is by an additional 40°. This partial crimp effectively, if only temporarily, holds second terminal housing member 68 in a desired position with anode 65, separator 64 and cathode 63 therebeneath.

Figure 10:
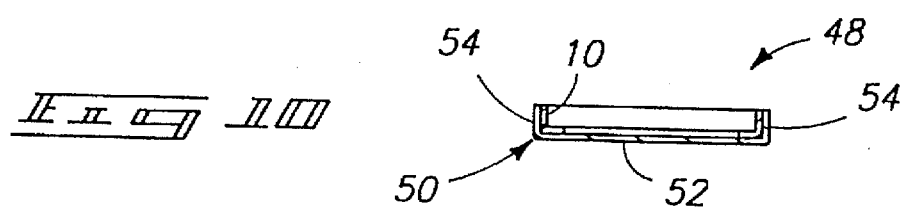
FIG. 10 is a side cross-sectional view of a single battery terminal housing member produced in accordance with methodical aspects of the invention.

Referring to FIGS. 14 and 15, sealing peripheral portions 54 of first terminal housing member 48 are further bent about peripheral bend 50 to form a single continuous peripheral bend which effectively crimps first and second terminal housing members 48 and 68 together. Such effectively forms an enclosed battery housing 75 with gasket material of sheet 10 being interposed between such first and second terminal housing members to provide a fluid-tight seal and to provide electrical insulation therebetween. A preferred battery made in accordance with the above example thickness components can have a finished total thickness of 0.5 mm (19.7 mils). A coating of pitch can be applied to the top and bottom of lid 68 and/or the formed can of FIG. 10 to improve the fluid-tight seal.

The above described embodiment is with respect to formation of a lower button-type battery terminal which functions as the initial container for retaining the internal battery components during crimping. Aspects of the invention would also be usable in creation of a button-type lid.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of forming a thin profile battery terminal housing member, the thin profile battery having a thickness which is less than a maximum linear dimension of its anode, the method comprising:

providing an electrically conductive sheet having an exposed surface;

masking a portion of the exposed sheet surface with a masking material;

applying an uncured and flowable gasket material onto an unmasked portion of the exposed sheet surface;

allowing the applied uncured gasket material to at least partially cure; and after at least partially curing the gasket material, removing the masking material from the masked portion of the exposed sheet surface.

2. The method of claim 1 wherein the applying step comprises:

providing a gasket material spreader bar in close proximity to the conductive sheet having the masking material thereon;

providing the flowable gasket material onto the conductive sheet and over the masking material adjacent the spreader bar; and imparting relative movement between the spreader bar and the conductive sheet to cause the spreader bar to apply a substantially even film of the gasket material to the unmasked portion of the sheet.

3. The method of claim 1 wherein the masking material comprises a photo-imageable solder masking material.

4. The method of claim 1 wherein the masking comprises pad printing the masking material onto the exposed sheet surface.

5. The method of claim 1 wherein the masking comprises screen printing the masking material onto the exposed sheet surface.

6. The method of claim 1 wherein the masking comprises spray painting the masking material onto the exposed sheet surface.

7. A method of forming a thin profile battery terminal housing member, the thin profile battery having a thickness which is less than a maximum linear dimension of its anode, the method comprising:

providing an electrically conductive sheet having an exposed surface;

forming a negative masking block on a portion of the exposed sheet surface;

forming a gasket on a portion of the sheet surface not covered by the negative masking block;

after forming the gasket, removing the negative masking block from the sheet.

8. The method of claim 7 wherein the gasket is formed from an initially uncured and flowable gasket material.

9. The method of claim 7 wherein the negative masking block comprises a photo-imageable solder masking material.

10. The method of claim 7 further comprising forming a plurality of negative masking blocks on the exposed sheet surface.

11. A method of forming a thin profile battery having a thickness which is less than a maximum linear dimension of its anode, the method comprising:

forming a sacrificial negative mask on a first portion of an electrically conductive sheet;

curing gasket material onto a second portion of the sheet unmasked by the negative mask;

removing the sacrificial negative mask from the sheet; and forming the sheet into a thin profile battery.

12. The method of claim 11 wherein the mask forming comprises adhering masking material to the sheet, the masking material being selectively etchable from the conductive sheet and gasket material, and the mask forming comprising pad printing the masking material to the sheet.

13. The method of claim 11 wherein the mask forming comprises adhering masking material to the sheet, the masking material being selectively etchable from the conductive sheet and gasket material, and the mask forming comprising screen printing the masking material to the sheet.

14. The method of claim 11 wherein the mask forming comprises adhering masking material to the sheet, the masking material being selectively etchable from the conductive sheet and gasket material, and the mask forming comprising spray printing the masking material to the sheet.

15. A method of forming a thin profile battery terminal housing member sheet, the thin profile battery having a thickness which is less than a maximum linear dimension of its anode, the method comprising:

providing an electrically conductive sheet having an exposed surface, the conductive sheet being divisible into a plurality of individual button-type battery terminal housing member regions;

masking portions of the respective regions of the exposed sheet surface with a masking material;

applying an uncured and flowable gasket material onto unmasked portions of the respective regions of the exposed sheet surface;

allowing the applied uncured gasket material to at least partially cure; and after at least partially curing the gasket material, removing the masking material from the masked portions of the respective regions of the exposed sheet surface.

16. The method of claim 15 wherein the masking material is deposited to the exposed surface to a selected thickness, the applying step comprising providing the gasket material onto the unmasked portions to substantially the same selected thickness.

17. The method of claim 15 wherein the applying step comprises:

providing a gasket material spreader bar in close proximity to the conductive sheet having the masking material thereon;

providing the flowable gasket material onto the conductive sheet and over the masking material adjacent the spreader bar; and imparting relative movement between the spreader bar and the conductive sheet to cause the spreader bar to apply a substantially even film of the gasket material to the unmasked portions of the respective regions.

18. A method of forming a thin profile battery having a thickness which is less than a maximum linear dimension of its anode comprising the following steps:

providing a terminal housing member electrically conductive sheet having cured electrically insulative gasket material adhered thereto in patterns, the terminal housing member conductive sheet having been provided by:

providing an electrically conductive sheet having an exposed surface, the conductive sheet being divisible into a plurality of individual button-type battery terminal housing member regions;

masking portions of the respective regions of the exposed sheet surface with a masking material;

applying an uncured and flowable gasket material onto unmasked portions of the respective regions of the exposed sheet surface;

allowing the applied uncured gasket material to at least partially cure; and after at least partially curing the gasket material, removing the masking material from the masked portions of the respective regions of the exposed sheet surface;

cutting and forming a plurality of discrete first terminal housing members from the electrically conductive sheet regions, the forming including bending the discrete first terminal housing members into desired battery terminal shapes;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and sealing the first and second terminal housing members together into an enclosed battery housing with the gasket material being interposed between the first and second terminal housing members to provide a fluid-tight seal and to provide electrical insulation therebetween.

* * * * *